United States Patent
Hrabar (10) Patent No.: US 10,461,440 B2
(45) Date of Patent: Oct. 29, 2019

(54) ANTENNA-TRANSMITTER ARRAY

(71) Applicant: Silvio Hrabar, Zagreb (HR)

(72) Inventor: Silvio Hrabar, Zagreb (HR)

(73) Assignee: University of Zagreb Faculty of Electrical Engineering and Computing, Zagreb (HR)

( * ) Notice: Subject to any disclaimer, the term of this patent is extended or adjusted under 35 U.S.C. 154(b) by 0 days.

(21) Appl. No.: 15/813,511

(22) Filed: Nov. 15, 2017

(65) Prior Publication Data

US 2019/0148841 A1 May 16, 2019

(51) Int. Cl.
*H01Q 21/24* (2006.01)
*H04B 7/10* (2017.01)

(52) U.S. Cl.
CPC ............. *H01Q 21/24* (2013.01); *H04B 7/10* (2013.01)

(58) Field of Classification Search
CPC ..................................................... H03H 11/10
See application file for complete search history.

(56) References Cited

U.S. PATENT DOCUMENTS

| | | | | |
|---|---|---|---|---|
| 2,288,621 A * | 7/1942 | Meyer | ..................... | B21C 47/24 198/463.4 |
| 2,852,680 A | 9/1958 | Radcliffe, Jr. et al. | | |
| 3,051,920 A * | 8/1962 | Sandberg | ............... | H03H 11/10 333/213 |
| 4,442,434 A * | 4/1984 | Baekgaard | ............... | H01Q 7/00 343/701 |
| 5,486,794 A | 1/1996 | Wu et al. | | |
| 8,604,985 B1 * | 12/2013 | Wolf | ........................ | H01Q 1/36 343/705 |
| 9,960,484 B2 * | 5/2018 | Chieh | ....................... | H01Q 1/36 |
| 2008/0158076 A1 * | 7/2008 | Walley | ................... | H01Q 9/145 343/745 |
| 2011/0110439 A1 * | 5/2011 | Miyaoka | .............. | H04B 1/0475 375/259 |
| 2012/0256709 A1 * | 10/2012 | Hitko | ........................ | H03F 1/56 333/216 |
| 2013/0009724 A1 * | 1/2013 | Xu | ........................ | H04B 1/0458 333/32 |
| 2013/0187826 A1 * | 7/2013 | Hutcheson | ............. | H01Q 1/243 343/860 |
| 2014/0035786 A1 * | 2/2014 | Ley | ...................... | H01Q 9/0407 343/700 MS |

(Continued)

OTHER PUBLICATIONS

Chen en al.; Wireless Synchronization and Spatial Combining of Widely Spaced mm-Wave Arrays in 65-nm CMOS; Apr. 12, 2017; IEEE (Year: 2017).*

(Continued)

*Primary Examiner* — Dameon E Levi
*Assistant Examiner* — AB Salam Alkassim, Jr.
(74) *Attorney, Agent, or Firm* — Shalini Venkatesh (57) ABSTRACT

A radiofrequency transmitter comprises a negative impedance converter having an input port and an output port; a first antenna electrically coupled to the input port of said negative impedance converter and operatively configured to emit electromagnetic radiation of a first polarization; and a second antenna electrically coupled to the output port of the negative impedance converter and operatively configured to emit electromagnetic radiation of a second polarization. The radiofrequency transmitter is operatively configured to emit an oscillating signal having a first frequency.

9 Claims, 7 Drawing Sheets

(56) References Cited

U.S. PATENT DOCUMENTS

| | | | | |
|---|---|---|---|---|
| 2014/0233614 A1* | 8/2014 | Crawley | ............. | H04B 1/40 |
| | | | | 375/219 |
| 2015/0318607 A1* | 11/2015 | Chieh | ............. | H01Q 1/36 |
| | | | | 343/749 |
| 2015/0318612 A1* | 11/2015 | Karlsson | ............. | H01Q 7/00 |
| | | | | 343/852 |
| 2018/0123567 A1* | 5/2018 | Hu | ............. | H03H 11/44 |
| 2018/0212319 A1* | 7/2018 | White | ............. | H01Q 9/16 |
| 2019/0089040 A1* | 3/2019 | Church | ............. | H01Q 1/288 |

OTHER PUBLICATIONS

S. E. Sussman-Fort, R. M. Rudish, "Non-Foster impedance matching of electrically-small Antennas," IEEE Transactions on Antennas and Propagation, pp. 2230-2241, vol. 57, Aug. 2009.

J.G. Linvill, "Transistor Negative Impedance Converters" Proceedings IRE, vol. 41, pp. 725-729, Jun. 1953.

Stephen E. Sussman-Fort, Ron M. Rudish, "Non Foster Impedance Matching for Transmit Applications," 2006 IEEE International Workshop on Antenna Technology Small Antennas and Novel Metamaterials, pp. 53-56, Mar. 6-8, 2006.

E.Ugarte-Muñoz, S. Hrabar, D, Segovia-Vargas, A. Kiricenko,"Stability of Non-Foster Reactive Elements for use in Active Metamaterials and Antennas", IEEE Tran. on AP-S, vol. 60, No. 7, pp. 3490-3494, 2012.

S. Hrabar and A. Kiricenko, "Towards Broadband Tunable non-Foster Radiating Systems", 10th International Congress on Advanced Electromagnetic Materials in Microwaves and Optics (Metamaterials), pp. 133-135, 2016.

S. Hrabar, A. Kiricenko, and I. Krois, "Antenna-transmitter based on Non-Foster Source", Proceedings of the 2017 IEEE International Symposium on Antennas and Propagation (APS / URSI), Jul. 2017.

* cited by examiner

ANTENNA-TRANSMITTER ARRAY

BACKGROUND

Figure 1:
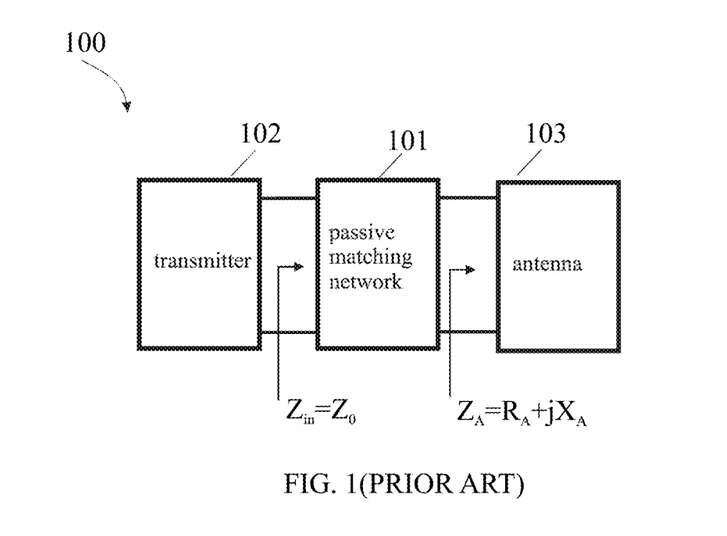
FIG. 1: Simplified schematic showing a classic passive matching of transmitting antenna (PRIOR ART).

Maximizing the amount of signal power delivered by an RF transmitter to an antenna is an important goal of every wireless system. This power maximization is achieved by matching the antenna input impedance to the output impedance of a transmitter. A conventional antenna transmitter system 100, shown in FIG. 1, comprises a passive matching network 101 inserted between a transmitter 102 and an antenna 103. The passive matching network 101 receives a signal solely from the transmitter 102 and delivers power to the antenna 103, while it is not connected to any external energy source. The passive network 101 typically comprises one or more capacitors and one or more inductors, or one or more segments of a transmission line, which can be arranged in several configurations generally known in the art of impedance matching. The purpose of the passive network 101 is to transform the impedance of antenna 103 ($Z_A = R_A + jX_A$, where $R_A$ and $X_A$ are the antenna input resistance and the antenna input reactance, respectively) into a system impedance $Z_0$ (usually 50 ohms). The transformation is needed for an efficient transfer of the energy from the transmitter 102 to the antenna 103. It is well known that, for every passive matching network, a matching bandwidth with maximal allowable modulus of a reflection coefficient is constrained by Bode-Fano criterion. A bandwidth constraint is a direct consequence of an inherent fundamental dispersion property of all reactive networks (the networks that comprise only capacitors or only inductors or only transmission lines, or any arbitrary combination of these elements). The fundamental dispersion constraint is given by Foster reactance theorem:

$$\frac{\partial [X(\omega)]}{\partial \omega} > 0, \; \frac{\partial [B(\omega)]}{\partial \omega} > 0.$$

Here, X and B are a reactance and a susceptance, respectively while $\omega$ represents the angular frequency. Due to Foster theorem, every passive matching network inevitably operates within a finite bandwidth. The background information on Foster reactance theorem and passive matching is available in publicly available textbooks, such as, D. M. Pozar, "Microwave Engineering", Willey 1998.

Modern wireless communication systems use high data rates with wide channel bandwidths. In addition, many portable communication devices (cell phones, smart phones, laptops, military mobile transceivers) as well as some fixed communication systems (broadcasting short-wave transmitters) use antennas of a very small size (in terms of a wavelength). It is well known that an impedance of a small antenna is inevitably highly reactive, which significantly limits the achievable matching bandwidth (for instance, see W. L. Stutzman, G. A. Thiele, "Antenna Theory and Design", Willey 2012). Quite often, a passive matching network cannot achieve an acceptable impedance match within a full desired bandwidth. The typical fractional bandwidth, defined as useful bandwidth divided by its center frequency, achievable using a passive matching of a small antenna ranges between 10 to 15%. On the other hand, Non-Foster Networks can be used to realize significantly wider matching bandwidths. Non-Foster Networks are active networks, namely, they include an energy source, and contain so-called Non-Foster elements: "negative" capacitors and "negative" inductors. These active components are referred to as Non-Foster elements because they do not obey Foster reactance theorem mentioned above. In brief, active broadband matching relies on a compensation of a frequency dispersion of ordinary reactive network with the 'inverse' dispersion provided by a 'negative' non-Foster network. This active compensation yields (theoretically) infinite bandwidth as is well known in the art. See publicly available documents, such as: S. E. Sussman-Fort, R. M. Rudish, "Non-Foster impedance matching of electrically-small Antennas," IEEE Transactions on Antennas and Propagation, pp. 2230-2241, vol 57, August 2009, S. Koulouridis, "Impedance matching for small antennas using passive and active circuits", John Volakis, Chi-Chih Chen, Kyohei Fujimoto, Eds., "Small Antennas: Miniaturization Techniques & Applications", New York: McGraw Hill, 2010, pp. 361-388). In practice, the 'negative' elements are realized using appropriate electronic circuitry that are generally referred to as "negative impedance converters" (NICs). A number of different NIC designs has been studied in the prior art (see, for example, J. G. Linvill, "Transistor Negative Impedance Converters" Proceedings IRE, Vol. 41, pp. 725-729, June 1953; Stephen E. Sussman-Fort, "Gyrator-Based Biquad Filters and Negative Impedance Converters for MicroWaves," International Journal of RF and Microwave Computer-Aided Engineering, Vol. 8, No. 2, pp. 86-101, 1998; D. Segovia-Vargas, V. Gonzalez-Posadas, J. L. Jimenez, E. Ugarte-Munoz, J. Herraiz-Martinez and L. E. Garcia-Munoz, "Negative Impedance Converters (NICs) in the Design of Small and Multifrequency Antennas", Proceedings of the 5th European Conference on Antennas and Propagation (EUCAP), 2011, p. 2724-272).

Figure 2:
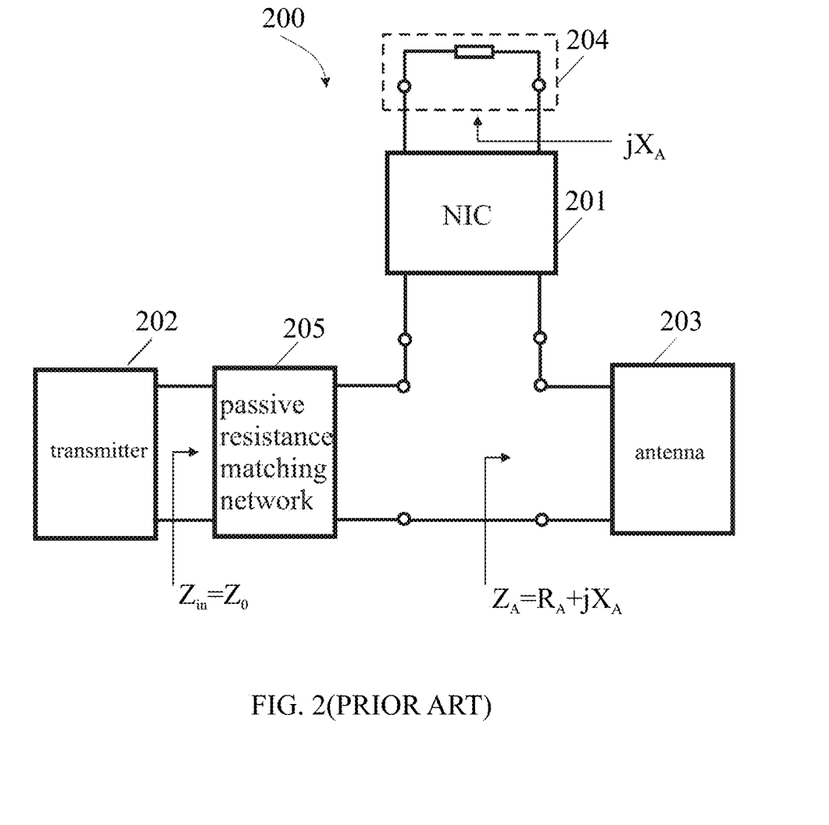
FIG. 2: Simplified schematic showing a classic non-Foster (active) matching of transmitting antenna (PRIOR ART).

FIG. 2 illustrates an example of a conventional actively matched transmitter system 200 comprising of a signal source 202, passive resistance matching network 205, the NIC 201 and an antenna 203. The NIC 201 is attached to a load 204. The signal is generated at the signal source 202 and transmitted to the antenna 203 via the passive matching network 205 and NIC 201. In order to cancel the reactance of the antenna 203, the NIC load impedance 204 has to be equal to the imaginary part of the antenna 203 impedance $Z_A$. The resistance 'left out' after the antenna reactance cancelation is transformed to a system impedance (usually 50 ohms) using the additional passive resistance matching network 205.

There are two important problems that limit the widespread use of a non-Foster matching for transmitting applications, based on the principle explained in FIG. 2: the design of an efficient NIC, and the assurance of a stable operation without unwanted oscillations. Due to aforementioned problems, there are only a few publicly available documents that report on non-Foster-matched transmitters and they only demonstrate limited success.

Improved efficiency with non-Foster matching of the transmitting antenna has been reported experimentally in Stephen E. Sussman-Fort, Ron M. Rudish, "Non Foster Impedance Matching for Transmit Applications," 2006 IEEE International Workshop on Antenna Technology Small Antennas and Novel Metamaterials, pp. 53-56, Mar. 6-8, 2006; S. E. Sussman-Fort, R. M. Rudish, "Increasing Efficiency or Bandwidth of Electrically-Small Transmit Antennas by Impedance Matching With Non-Foster Circuits," PIERS 2006, Mar. 26-29, 2006. A different approach that, instead of direct antenna matching, uses a non-Foster network embedded within a transmitting power amplifier, was proposed theoretically in M. W. Yung and D. A Hitko, "Non-Foster Impedance Power Amplifier", U.S. Pat. No. 8,374,561 B1.

Reaching stability in non-Foster networks (assurance of stable operation of a non-Foster circuit without unwanted self-oscillations) is a difficult problem. The difficulty comes from the fact that all existing designs of negative elements (i.e. all the realizations of NIC circuits that behave as negative capacitors or negative inductors) are based on amplifiers with positive feedback. Thus, all non-Foster circuits are inherently prone to instabilities. There have been several approaches to avoid occurrence of the instability. They are reported in E.Ugarte-Muñoz, S. Hrabar, D, Segovia-Vargas, A. Kiricenko, "Stability of Non-Foster Reactive Elements for use in Active Metamaterials and Antennas", IEEE Tran. on AP-S, Vol. 60, No. 7, pp. 3490-3494, 2012; S. D. Stearns, "Non-Foster Circuits and Stability Theory," IEEE International Symposium on Antennas and Propagation paper 326.1, pp. 1942-1945, Spokane, Wash., Jul. 3-8, 2011.; J. Loncar, S. Hrabar, D. Muha, "Stability of simple lumped-distributed networks with negative capacitors", IEEE Transactions on Antennas and Propagation, vol. 65, no. 1, pp. 390-395, January 2017; Q. Tang, H. Xin, "Stability Analysis of Non-Foster Circuit Using Normalized Determinant Function", IEEE Transactions on Microwave Theory and Techniques, Vol. 65, No. 9, Sep. 2017, pp. 3269-3277). In spite of all the efforts, a stability issue is still not well understood, which makes a design of stable non-Foster circuit extremely challenging engineering task. In practice, achieving a stable operation of an active non-Foster matching network usually requires many simulation-design-testing cycles, which is very tedious and expensive approach.

Apart from matching applications, the non-Foster elements are sometimes used for construction of the oscillators (Arthur J. Radclitfe, Jr., La Grange, III, "Negative-impedance Transistor Oscillator", U.S. Pat. No. 2,852,680; Jieh-Tsong Wu, Wei-Zen Shen, Tou-Liu, "Variable Frequency LC Oscillator Using Variable Impedance and Negative Impedance Circuits, U.S. Pat. No. 5,486,794).

A conference report by S. Hrabar and A. Kiricenko, entitled "Towards Broadband Tunable non-Foster Radiating Systems", $10^{th}$ International Congress on Advanced Electromagnetic Materials in Microwaves and Optics (META-MATERIALS), pp. 133-135, 2016 proposed unusual approach of managing stability issue of active non-Foster matching in transmitting applications. Abovementioned report describes a self-oscillating non-Foster matching network connected to a short dipole antenna (a dipole antenna shorter than $\lambda/10$, $\lambda$ being a wavelength of the signal).

Figure 3A:
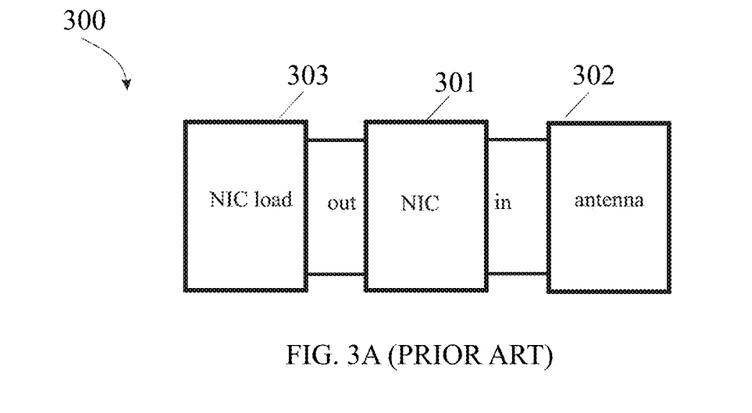
FIG. 3A: Simplified schematic showing a self-oscillating non-Foster matching network (PRIOR ART).
Figure 3B:
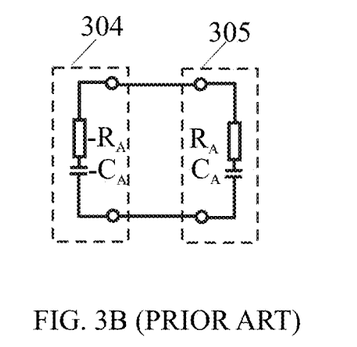
FIG. 3B: Simplified schematic showing an equivalent circuit of a self-oscillating non-Foster matching network (PRIOR ART).

A self-oscillating non-Foster matching network 300, is illustrated in FIG. 3A (PRIOR ART), shown to comprise a NIC 301 connected between the short dipole antenna 302 and a NIC load 303. The equivalent circuit 305 of the antenna 302 is shown in FIG. 3B (PRIOR ART), comprising a series combination of a resistor ($R_A$) and a capacitor ($C_A$). This series RC combination is the simplest equivalent circuit of a short dipole antenna. The NIC load 303, comprises substantially the same series combination of $R_A$ and CA as the antenna load, but the negative impedance converter (NIC) 301 transforms or inverts this positive impedance into a series circuit 304 with both negative capacitance and negative resistance as illustrated in FIG. 3B. The impedance of the NIC load seen through the NIC 301 appears as a series circuit 304 with resistance equal to $-R_A$ and capacitance equal to $-C_A$. The mesh impedance, defined as a sum of all impedances across a closed loop, equal to zero, namely, $-R_A-jX_A+R_A+jX_A=0$, where $X_A$ is the capacitive reactance of the antenna 302. The definition of mesh impedance and system stability of such a system is described in publicly available documents, such as, S. D. Stearns, "Counterintuitive Aspects of Non-Foster Networks," presentation Adelphi Antenna Workshop on Electrically Small Antennas, Clarksville, Md., July 8-9, 201. Because of the zero mesh impedance, the circuit system shown in FIG. 3B is a self-oscillating system that supports arbitrary signal waveform. In addition, all the energy generated by the negative resistance ($-R_A$) will be delivered to the antenna 302. In other words, all of the energy generated will be radiated by the antenna 302. Thus, the system represented by a circuit in FIG. 3B is perfectly matched.

Figure 3C:
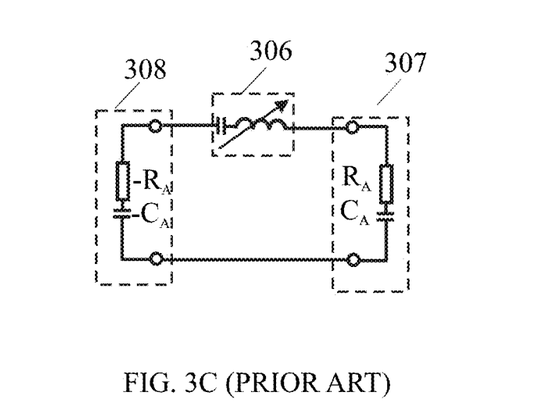
FIG. 3C: Simplified schematic showing an equivalent circuit of a tunable antenna-transmitter system (PRIOR ART).

The same system with the addition of a series resonant circuit 306 disposed between the antenna impedance 307 and the inverted NIC load impedance 308 is represented by a circuit in FIG. 3C. This consists of the negative RC circuit 308, connected to the antenna 307, via an additional series LC circuit 306. The purpose of the circuit 306 is tuning of a sinusoidal oscillating signal to any desired frequency. FIG. 3C actually depicts a tunable, perfectly matched, antenna-transmitter system. The antenna-transmitter system shown has theoretically an infinite tuning bandwidth with perfect matching. For this circuit, the inherent instability of the non-Foster circuit (the NIC 301, the antenna 302 and the load 303) is a desirable property of the system. Experimental verification of aforementioned idea (depicted in FIG. 3) was presented in the conference report by S. Hrabar, A. Kiricenko, and I. Krois, entitled "Antenna-transmitter based on Non-Foster Source", Proceedings of the 2017 IEEE International Symposium on Antennas and Propagation (APS/URSI), July 2017.

Although abovementioned antenna-transmitter system (depicted in FIGS. 3A, 3B, and 3C) has demonstrated a marked improvement in non-Foster transmission, several issues remain: firstly, an equivalent circuit of a short dipole antenna that comprises only one resistor and only one capacitor is not an excellent approximation, only valid within the narrow bandwidth. Due to the change of antenna impedance with frequency, both the antenna-transmitter tuning bandwidth and the impedance matching will always be significantly narrower than predicted using a simple RC model of a short antenna. Secondly, due to inevitable antenna imperfections as well as the influence of nearby objects on antenna properties, the impedance of the antenna in a realistic transmitting scenario cannot be predicted accurately. Thus, it would be necessary to measure the impedance of used short dipole antenna beforehand and, using measured data, to design a dedicated RC network used as the NIC load (the load 303 in FIG. 3A (PRIOR ART). This is impractical as each antenna requires a specially designed NIC load and does not allow a simple use of different antennas in different applications.

It is clear that a need in the industry still remains for a tunable RF antenna-transmitter system that exhibits operation over a wide band. This disclosure addresses the design that overcomes aforementioned drawbacks and assures broadly tunable self-oscillations with perfect matching, without a specially designed NIC load.

BRIEF DESCRIPTION OF THE INVENTION

This application discloses an improvement of the tunable antenna-transmitter system disclosed in prior art, achieved by using two antennas rather than one. By doing so it eliminates a need for specially designed NIC load 303 and enables use of different antenna types for different applications. This improved system behaves as a perfectly matched, broadband tunable antenna-transmitter array. The improved system has broader tuning bandwidth that one disclosed in prior art. Owing to the use of two transmitting antennas, the effective radiated isotropic power (EIRP) of the improved system is up to 3 dB higher than what can be achieved in prior art systems (such as that shown in FIGS. 3A, 3B, and 3C).

DETAILED DESCRIPTION OF THE INVENTION

An improvement in the tuning bandwidth and in the matching bandwidth of an antenna-transmitter system, as well as, the introduction of an additional feature of using different types of transmitting antenna without a need for the redesign of the system, is disclosed in sets of embodiments described in sections I, II and III.

A negative impedance converter (NIC) is a two-port electronic circuit that transforms an ordinary positive load impedance into a negative input impedance, the absolute value of which is substantially equal to the absolute value of the load impedance. The NIC that is stable if its input port is short-circuited is usually designated as the SCS (Short-circuit-stable NIC) or the N type NIC. On the other hand, a NIC that is stable if its input port is left open is usually designated as the OCS (Open-circuit-stable NIC) or the S type NIC. The NIC used in these embodiments can be either of N (SCS) type or of S (OCS) type, depending whether a parallel LC circuit tuning block or a series LC circuit tuning block is used.

I. Non-Foster Antenna-Transmitter Array

Figure 4A:
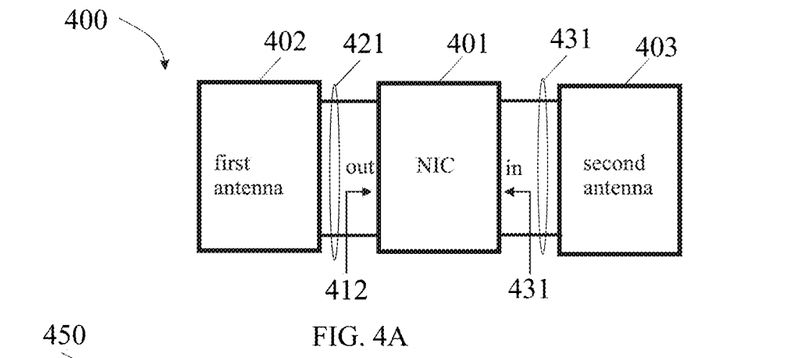
FIG. 4A: Embodiment of the non-Foster antenna-transmitter array using the present invention.
Figure 4B:
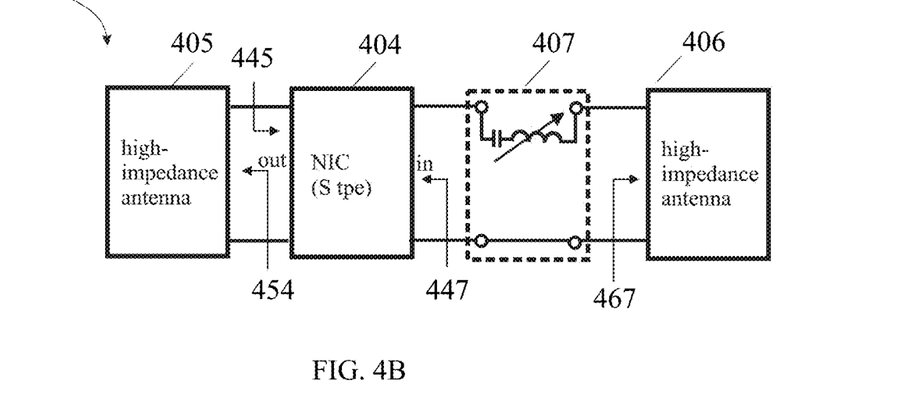
FIG. 4B: Embodiment of the non-Foster antenna-transmitter array with optional tuning block of a series LC type, using the present invention.
Figure 4C:
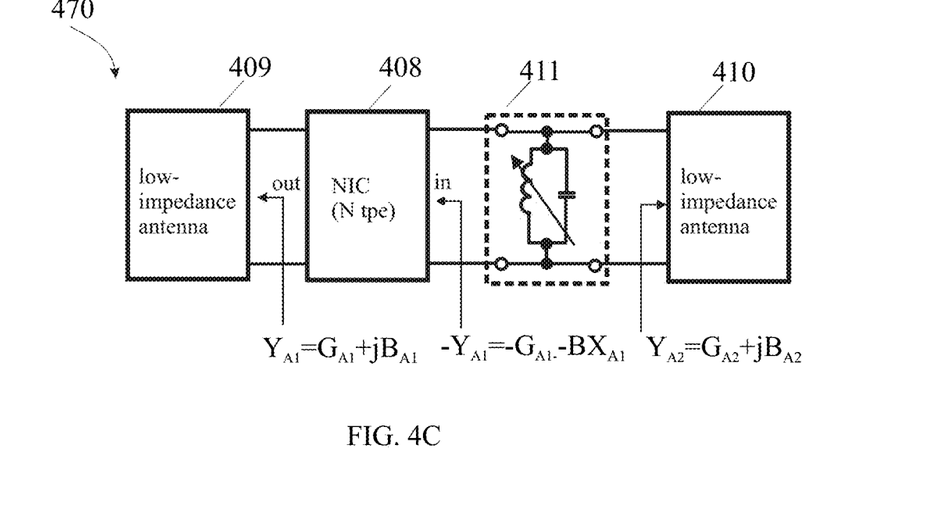
FIG. 4C: Embodiment of the non-Foster antenna-transmitter array with optional tuning block of a parallel LC type, using the present invention.

One embodiment that provides a significant improvement in the tuning and matching bandwidth of antenna-transmitter system is explained with the help of FIGS. 4A, 4B, and 4C.

FIG. 4A shows a non-limiting example of the transmitter-antenna system utilizing inventive concepts presented in this application. Transmitter-antenna system 400 comprises a first antenna 402, a second antenna 403, and a negative impedance converter 401 disposed between them. Said negative impedance converter 401 comprises one input port 431 and one output port 412. The first antenna 402 is electrically coupled to the output port 412 of said NIC 401 via an electrical connection 421. Similarly, the second antenna 403 is electrically coupled to the input port 431 using an electrical connection 431. The electrical connections 421 and 431 may include two electrical conductors, as in a coaxial cable, or may use a waveguide as is well known in the art of radiofrequency systems. In one embodiment, the transmitting antenna 402 is substantially identical to antenna 403 and has the same input impedance (and the same input admittance) as antenna 403. In yet another embodiment, said first antenna polarization is orthogonal to said second antenna polarization. The NIC 401 changes the sign of the impedance (and a sign of the admittance) of the antenna 402. Due to the sign change, both the mesh impedance and the nodal admittance of the electrical circuit between the input port 431 of the NIC 401 and the second antenna 403 are equal to zero at every frequency and hence the system supports self-oscillation of the signal of arbitrary waveform. During oscillation, power is delivered to both antennas 402 and 403, and since the antennas are perfectly matched, the net radiated power is two times higher than the radiated power of prior art systems of the type illustrated in FIGS. 3A, 3B, and 3C.

In another embodiment, illustrated in FIG. 4B, a transmitter-antenna system 450 comprises an S-type NIC 404 having a NIC input port 447 and NIC output port 445, a first antenna 405 having a first antenna port 454, said first antenna port 454 electrically coupled to said NIC output port 445, a second antenna 406 having a second antenna port 467, a series resonant circuit 407 electrically coupled to second antenna port 467 and NIC input port 447, said series resonant circuit 407 operatively configured to tune the self-oscillating frequency of the transmitter-antenna system 450. During normal operation, the resonant frequency $f_S$ of series resonant circuit 407 sets the emission frequency of said self-oscillating transmitter-antenna system. The self-oscillation is accomplished by adjusting the NIC 404 to establish zero mesh network impedance, namely, ensuring that the second antenna 406 impedance seen into port 467 and denoted with $Z_{A2}=R_{A2}+jX_{A2}$ exactly matches the negative of the impedance seen from the second antenna 406 towards the resonant circuit 407 and which includes the impedance of the NIC port 447. The impedance of the NIC port 447 has been inverted from the impedance of said first antenna 405. The impedance of second antenna port 467, denoted with $Z_{A2}=R_{A2}+jX_{A2}$, is substantially equal to the impedance of first antenna port 454, denoted with $Z_{A1}=R_{A1}+jX_{A1}$, namely, $Z_{A2} \cong Z_{A1}$. During normal operation, the impedance $Z_N$ of NIC input port 447 when first antenna 405 is electrically coupled to NIC output port 445 is substantially equal to impedance $Z_{A1}$ of first antenna port 454, but with a negative sign, namely, $Z_N \cong -Z_{A1}$. The NIC 404 changes the sign of the impedance of the antenna 405 seen from port 454. Thus, an equivalent input impedance of the NIC 404 is a negative image of the antenna impedance: $Z_N = -R_{A1} - jX_{A1}$. The current that flows through the equivalent input impedance of the NIC 404 is equal to the current that flows through the first transmitting antenna 405 because the used NIC is of S type.

The tuning block 407 is a passive circuit that exhibits near zero impedance at the resonant frequency. The tuning block 407 is shown as comprising a series LC circuit, but may be realized using any combination of inductors, capacitors or transmission lines as is well known in the art of designing and manufacturing of resonant circuits and filters. The tuning block 407 is operatively configured to tune the oscillation frequency of the transmitter-antenna system 450. Said tuning is accomplished by mechanical or electrical control means that change the resonance frequency of resonance circuit 407.

In normal operation, the operation of the NIC 404 is adjusted so that at the resonant frequency of the tuning block 407, the mesh (series) impedance of the circuit comprising of NIC 404, tuning block 407, and second antenna 406, equals zero. Since the impedance cancellation occurs only at the resonant frequency of the tuning block 407, the circuit depicted in FIG. 4B generates a sinusoidal oscillating current, the frequency of which is equal to the resonant frequency. The oscillating current flows through the first antenna 405 and, at the same time, through the second antenna 406, causing the radiation of electromagnetic energy. The impedance cancellation and the generation of a sinusoidal oscillating current occur regardless of the actual construction of the antennas used, providing that they are identical and, therefore, have equal input impedance at any frequency. The frequency-independent impedance equality of the antennas provides a tuning bandwidth and a matching bandwidth significantly larger than the tuning and matching bandwidth of the system reported in previous art (the system, in which the antenna impedance was mimicked by a specially constructed NIC load: FIG. 3C, PRIOR ART). Since there is no need for a specially designed NIC load in FIG. 4B, it is possible to use different antennas in different applications without a redesign of the system as necessary in prior art systems. Antennas 405 and 406 do not limit either the tuning or the matching bandwidth of the system in FIG. 4B; the limits are only set by the properties of NIC 404 and tuning block 407. Since the NIC 404 is of the S type (OCS), the antennas 405 and 406 can be any type of high-impedance antennas such as short dipole antennas used in prior art (FIGS. 3A, 3B, and 3C, PRIOR ART).

The use of low-impedance antennas is also possible with the modified circuit shown in FIG. 4C. FIG. 4C depicts an N-type NIC (SCS NIC) 408 connected between the first transmitting antenna 409 and the second transmitting antenna 410. The transmitting antennas 409 and 410 are substantially identical and they have substantially equal input admittances $Y_{A1} = G_{A1} + jB_{A1}$ and $Y_{A2} = G_{A2} + jB_{A2}$, G and B are the antenna conductance and the antenna susceptance, respectively. The NIC 408 changes the sign of the admittance of the antenna 409 port into the equivalent NIC input admittance: $-Y_{A1}$. The voltage across the equivalent input admittance of the NIC 408 ($-Y_{A1}$) is equal to the voltage across the first transmitting antenna 409 because the used NIC is of N type. Since the tuning block 411 is a parallel LC circuit it will have zero admittance at the resonant frequency. At the same resonant frequency, the nodal admittance (defined as the sum of the effective input admittance of the NIC 408, the admittance of the tuning block 409, and the admittance of the second transmitting antenna 410) will be equal to zero at every frequency. Due to above admittance cancellation, the circuit depicted in FIG. 4C is unstable and it generates sinusoidal oscillating voltage, a frequency of which is equal to the resonant frequency of the tuning block 411. The same oscillating voltage is present across the first antenna 409 and across the second antenna 410, causing the radiation of electromagnetic energy. The admittance cancellation and the generation of a sinusoidal oscillating current occur regardless of the actual construction of used antennas, providing that they are identical and, therefore, they have equal input admittance at any frequency. Since there is no need for a specially designed NIC load in FIG. 4C, it is possible to use different antennas in different applications without a redesign of the system (the redesign was necessary in prior art (FIGS. 3A, 3B, and 3C, PRIOR ART). Antennas 409 and 410 do not limit either the tuning or the matching bandwidth of the system in FIG. 4C; the limits are only set by the properties of NIC 408. Because the NIC 408 is of N type (SCS), the antennas 409 and 410 can be any type of low-impedance antennas such a small loop.

While only short electric dipole and magnetic dipole antennas were used to illustrate the embodiment shown in FIGS. 4A, 4B and 4C, it should be noted that other types of antenna may be used without departing from the spirit of the invention. For example, patch antennas, horn antennas, Yagi antennas, and other types used in the art may be used.

The eventual electromagnetic interaction between two antennas (crosstalk) was not discussed in the cases shown in FIGS. 4A, 4B, and 4C, as the crosstalk may be minimized using the approach disclosed in section II.

II. Antenna Array Arrangement with Minimized Mutual Impedance

Figure 5A:
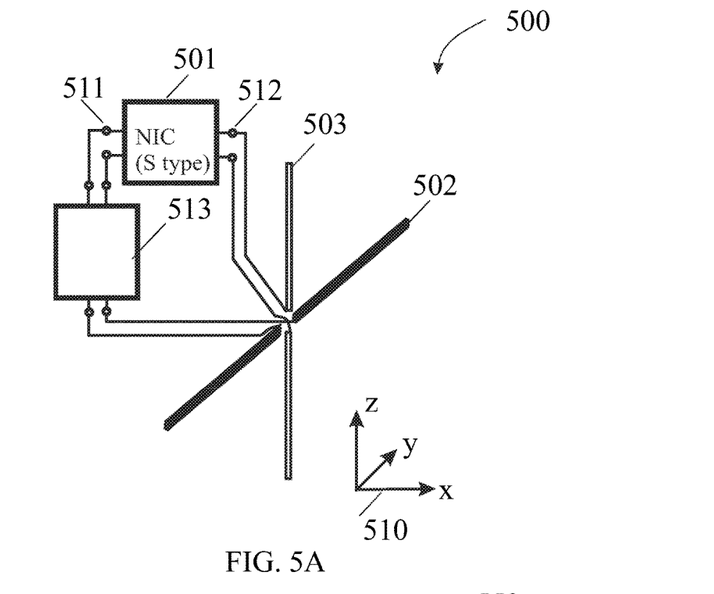
FIG. 5A: Embodiment of an antenna array arrangement with minimized mutual impedance for the non-Foster antenna-transmitter array using the present invention.
Figure 5B:
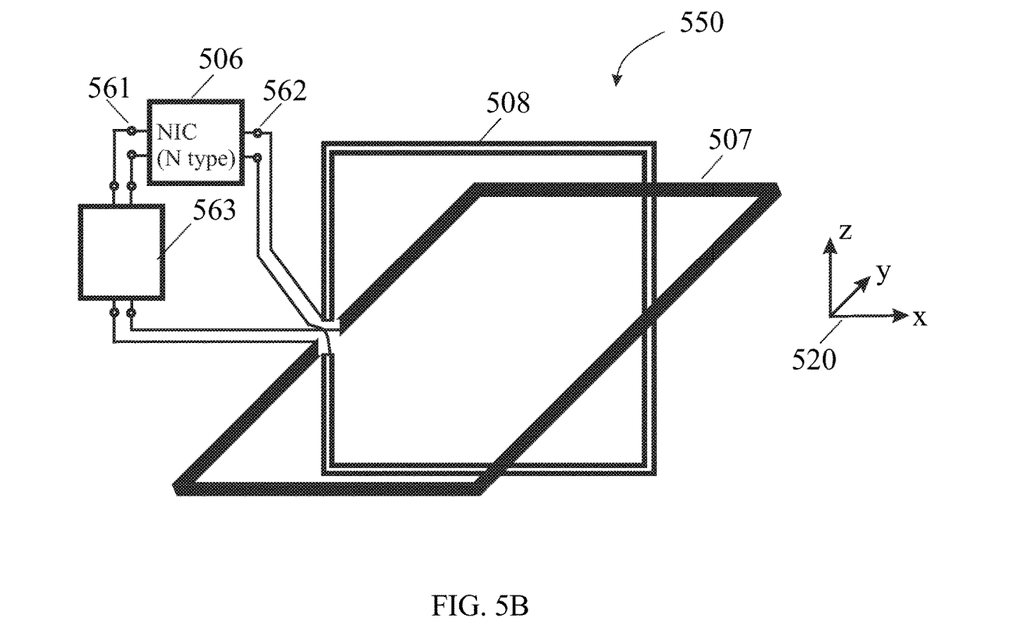
FIG. 5B: Another embodiment of an antenna array arrangement with minimized mutual impedance for the non-Foster antenna-transmitter array using the present invention.

FIGS. 5A and B illustrate embodiments of the transmitter-antenna system, one, 500, using an electrical dipole antenna 500, and the other, 550, using a magnetic dipole antenna.

In the embodiment shown in FIG. 5A, the antenna-transmitter system 500 comprises S-type NIC 501, first electric-dipole antenna 502 electrically coupled to the input port 511 of the S-type NIC 501 via an optional tuning block 513, and a second electric dipole antenna 503 electrically coupled to the output port 512 of the S-type NIC 501. The orientation of the first antenna 502 is operatively configured to emit electromagnetic radiation having a first polarization, while the orientation of the second antenna 503 is operatively configured to emit electromagnetic radiation having a second polarization. In one example of this embodiment, the first polarization is orthogonal to the second polarization in order to minimize electromagnetic crosstalk between the two antennas 502 and 503. In FIG. 5A, the electric dipole of antenna 502 is shown to be parallel to the y-axis of the defined coordinate system 510, while the electric dipole of antenna 503 is parallel to the z-axis of the defined coordinate system 510. In some examples of this embodiment, the tuning block 513 is not present and the first antenna 502 is directly electrically connected to the NIC port 511 of the S-type NIC 501. In the example shown in FIG. 5A, the tuning block 513 is present. The structure and operation of the antenna transmitter system 500 is described in connection with antenna transmitter system 450 in FIG. 4B.

In the embodiment shown in FIG. 5B, the antenna-transmitter system 550 comprises N-type NIC 506, first magnetic-dipole antenna 507 electrically coupled to the input port 561 of the N-type NIC 506 via an optional tuning block 563, and a second electric dipole antenna 508 electrically coupled to the output port 562 of the N-type NIC 506. The orientation of the first antenna 507 is operatively configured to emit electromagnetic radiation having a first polarization, while the orientation of the second antenna 508 is operatively configured to emit electromagnetic radiation oriented having a second polarization. In one example of this embodiment, the first polarization is orthogonal to the second polarization in order to minimize electromagnetic crosstalk between the two antennas 507 and 508. In FIG. 5B, the magnetic dipole of antenna 507 is shown to be parallel to the z-axis of the defined coordinate system 520, while the magnetic dipole of antenna 508 is parallel to the y-axis of the defined coordinate system 520. In some examples of this embodiment, the tuning block 563 is not present and the first antenna 507 is directly electrically connected to the NIC port 561 of the N-type NIC 501. In the example shown in FIG. 5B, the tuning block 563 is present. The structure and operation of the antenna transmitter system 550 is described in connection with antenna transmitter system 470 in FIG. 4C.

Regardless of the polarization, the antenna pairs shown in FIGS. 4A, 4B, 4C can have substantially identical input impedances. The free-space crosstalk between the two antennas in a pair may be neglected owing to their opposite polarizations. Any type of either high-impedance or low-impedance antennas such as short dipole antennas, slot antennas, small loops, patch antennas, etc. can be used without departing from the spirit of the invention.

III. External Injection Locking Tuning System

Several of the examples embodiments disclosed above used tuning blocks for tuning and selecting the frequency of operation of the antenna-transmitter system. The tuning range of every practical passive circuit is constrained by the construction of variable capacitors or variable inductors or both, while fringing fields and conductor losses in the passive LC circuit exhibit power loss during operation. In some cases, especially in systems that operate with very high output power, these losses may result in degraded performance. Further improvement can be accomplished using external frequency locking. This embodiment, which provides an improvement in efficiency, is explained with the help of FIGS. 6A and 6B.

Figure 6A:
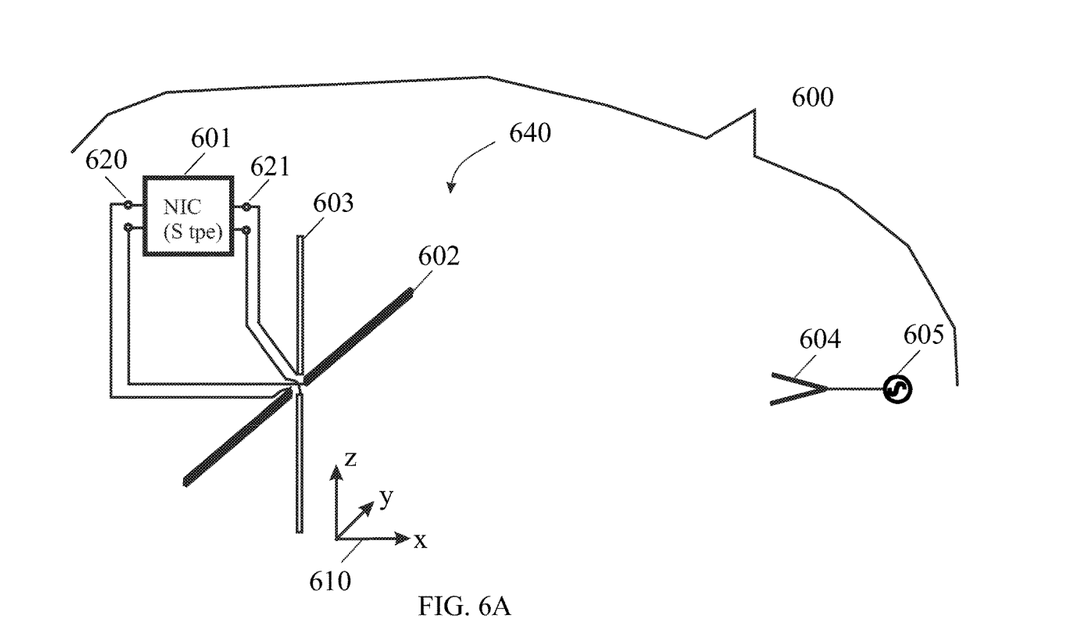
FIG. 6A: Embodiment of an external injection locking tuning system for the non-Foster antenna-transmitter array using the present invention.

In the embodiment shown in FIG. 6A, antenna transmitter system 600 comprises antenna transmitter module 640 comprising an S-type NIC 601 having an input port 620 and an output port 621, a first antenna 602 electrically coupled to the input port 620 of S-type NIC 601, and a second antenna 603 electrically coupled to the output port 621 of S-type NIC 601. System 600 additionally comprises a radiofrequency synthesizer 605 and a third antenna 604 electromagnetically coupled to the antennas 602 and 603. Electromagnetically coupled means that electromagnetic radiation from third antenna 604 can be detected by the antennas 602 and 603 and the signal emitted by the synthesizer 605 has the ability to injection lock the frequency of the antenna transmitter module 640 in normal operation.

The antennas 602 and the antenna 603 radiate and receive electromagnetic waves of orthogonal polarizations. This minimizes the mutual impedance between the antennas 602 and 603. Since there is no phase difference between a signal that excites the antenna 602 and a signal that excites the antenna 603, the net polarization of the two-antenna array is linear, with the electric field vector laying in z-y plane and oriented at the angle of 45 degrees (with respect to the y axis). The third antenna 604 is powered by the synthesized RF source 605. The antenna 604 is pointed towards the antenna-transmitter module 640 and it radiates an electromagnetic wave, having a linear polarization equal to the net polarization of the two-antenna transmitting antenna array 602 and 603. The oscillation frequency is determined solely by the synthesized RF source 605, via the process of injection locking. Injection locking is a concept well known in the art of radiofrequency systems and components, with background information available from publicly available sources, such as, B. Razavi, "A Study of Injection Locking and Pulling in Oscillators, IEEE Journal of Solid-State Circuits, Vol. 39, No 9, September 2004. Finally, the oscillating frequency of the non-Foster antenna-transmitter array is tuned by adjusting a frequency of the external RF synthesized source 605.

Figure 6B:
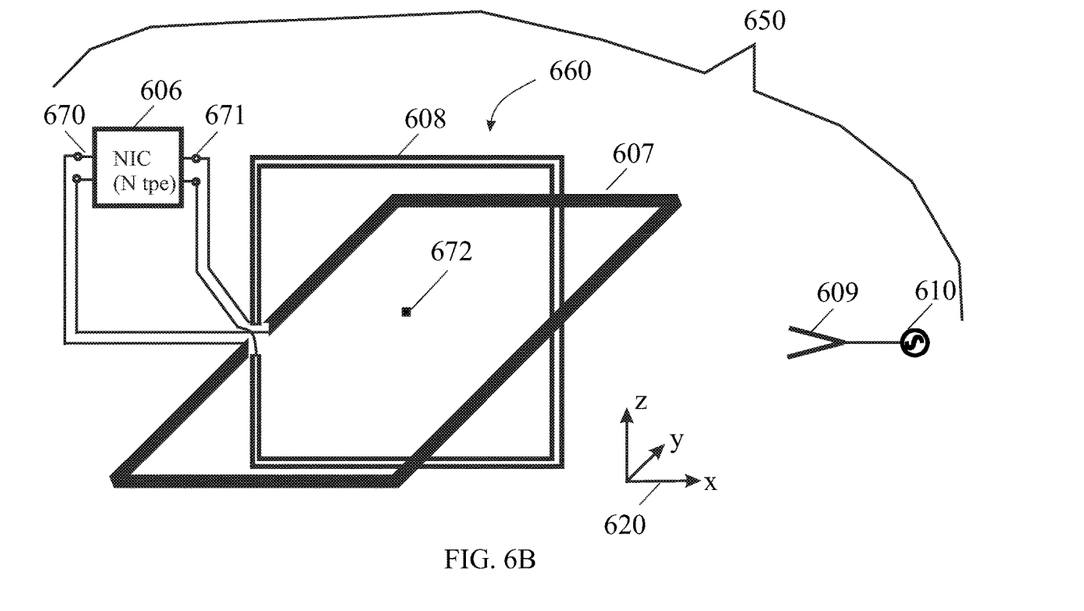
FIG. 6B: Another embodiment of an external injection locking tuning system for the non-Foster antenna-transmitter array using the present invention.

The use of low-impedance antennas is also possible with the modified arrangement shown in FIG. 6B. In one embodiment, antenna transmitter system 650 comprises antenna transmitter module 660 comprising an N-type NIC 606 having an input port 670 and an output port 671, a first antenna 607 electrically coupled to the input port 670 of S-type NIC 606, and a second antenna 608 electrically coupled to the output port 671 of N-type NIC 606. Module 660 additionally comprises a radiofrequency synthesizer 610 and a third antenna 609 electromagnetically coupled to the antennas 607 and 608. Electromagnetically coupled means that electromagnetic radiation from third antenna 609 can be detected by the antennas 607 and 608 and the signal emitted by the synthesizer 610 has the ability to injection lock the frequency of the antenna transmitter module 660. The first antenna 607 radiates horizontally polarized electromagnetic waves, namely, the electric field is parallel to the y-axis. The second antenna 608 radiates vertically polarized electromagnetic waves, namely, the electric field is parallel to the z-axis. The phase centers of the transmitting antennas 607 and 608 are located at the same point (at the center of the loops 672). Since there is no phase difference between a signal that excites the antenna 607 and a signal that excites the antenna 608, the net polarization of the two-antenna array is linear, with the electric field vector laying in z-y plane and oriented at the angle of 45 degrees (with respect to the y axis). The antennas 607 and 608 are connected to the output port 671 and the input port 670 of the NIC 606, respectively. The third (external) antenna 609 is fed by the synthesized RF source 610. The antenna 609 is pointed towards the transmitting array (comprising the antennas 607 and 608). The antenna 609 radiates an electromagnetic wave, a polarization of which is equal to the resultant polarization of the transmitting array (comprising the antennas 607 and 608). Since the antenna-transmitter array does not include any resonant element, the oscillating frequency will be solely determined by the synthesized RF source 610 via the process of injection locking. Hence, an oscillating frequency of the non-Foster antenna transmitter array is tuned by adjusting a frequency of the external RF synthesized source 610.

Figure 7:
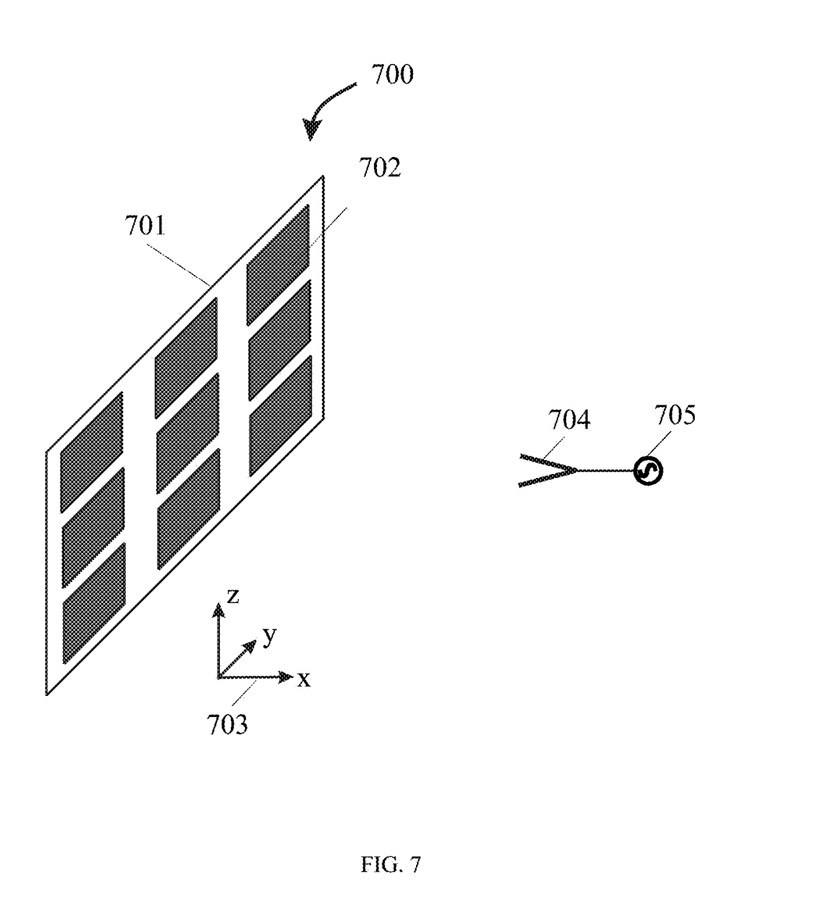
FIG. 7: Embodiment of a master array comprising of an array of non-Foster antenna-transmitter subarrays with external injection locking that tunes the system using the present invention.

In yet another embodiment, a multiplicity of antenna-transmitter modules is arranged to form a linear or two-dimensional array of transmitters, with at least one radiofrequency synthesizer and a third antenna located in the vicinity to injection lock the entire linear or two-dimensional array of antenna-transmitter modules to form an arrayed antenna-transmitter system. FIG. 7 shows a non-limiting example of an implementation of a arrayed antenna-transmitter system 700 comprising a multiplicity of antenna transmitter modules 702 arranged to form a two-dimensional array 701 of transmitters, at least one radiofrequency synthesizer 705 and a third antenna 704. Each of the antenna-transmitter modules 702 has the structure of either antenna transmitter 600 or antenna transmitter 650 shown in FIG. 6. The radiofrequency signal emitted by the third antenna 704 is electromagnetically coupled to two-dimensional array 701 of transmitters 702. Electromagnetically coupled means that electromagnetic radiation emitted from third antenna 704 can be detected by each of the antenna-transmitters 702 in the two-dimensional array 701, and the signal generated by the synthesizer 705 has the ability to injection lock the frequency of each of the antenna-transmitter 702 in the two-dimensional array 701 in normal operation.

While the arrayed antenna-transmitter system 700 is shown in FIG. 7 as a planar rectangular two-dimensional array, it should be noted that linear arrays or arrays of any other shape may be used without departing from the spirit of the invention.

IV. Other Variations on the Embodiments

Having described the invention in connection with certain embodiments thereof, modifications will now suggest itself to those skilled in the art. For instance, a modulation feature can be added to an externally tuned antenna-transmitter array by modulating a synthesized RF source.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A self-oscillating radiofrequency transmitter comprising:
   a negative impedance converter having an input port and an output port;
   a first antenna electrically coupled to said input port of said negative impedance converter; and
   a second antenna electrically coupled to said output port of said negative impedance converter;
   wherein self-oscillation of a signal of arbitrary waveform is generated in the negative impedance converter and the first and second antennas without using any resonant element;
   wherein said self-oscillation results in the first antenna emitting electromagnetic radiation of a first polarization and the second antenna emitting electromagnetic radiation of a second polarization, such that a superposition of the emissions from the first and second antennas is emitted at a first frequency by the radiofrequency transmitter; and
   wherein no electrical connection is present between either one of the first and second antennas and any radiofrequency source external to the negative impedance converter.

2. The radiofrequency transmitter of claim 1, wherein said first polarization is orthogonal to said second polarization.

3. The radiofrequency transmitter of claim 2, further comprising:
   a remote transmitter that generates an injection-locking oscillating signal of a second frequency; and
   a third antenna electrically coupled to said remote transmitter and electromagnetically coupled to said radiofrequency transmitter,
   wherein said first frequency is substantially equal to said second frequency.

4. A radiofrequency transmitter system comprising:
   a multiplicity of transmitter modules, each module comprising:
   a negative impedance converter having an input port and an output port;
   a first antenna electrically coupled to said input port of said negative impedance; and
   a second antenna electrically coupled to said output port of said negative impedance converter;
   wherein self-oscillation of a signal of arbitrary waveform is generated in the negative impedance converter and the first and second antennas without using any resonant element;
   wherein said self-oscillation results in the first antenna emitting electromagnetic radiation of a first polarization and the second antenna emitting electromagnetic radiation of a second polarization, such that a superposition of the emissions from first and second antennas is emitted at a first frequency, by the module;
   wherein no electrical connection is present between either one of the first and second antennas and any radiofrequency source external to the negative impedance converter;
   a remote transmitter that generates, an injection-locking oscillating signal of a remote frequency, and
   a third antenna electrically coupled to said remote transmitter and electromagnetically coupled to at least one of said transmitter modules,
   wherein the module frequencies of each of the transmitter modules coupled to the third antenna are substantially equal to each other and to said remote frequency.

5. The radiofrequency transmitter of claim 4, wherein said first polarization is orthogonal to said second polarization.

6. A radiofrequency transmitter comprising:
   a negative impedance converter having an input port and an output port;
   a tuning block having a first port, electrically coupled to said input port of said negative impedance converter, and a second port; said tuning block being characterized by a tuning frequency;
   a first antenna electrically coupled to said second port of said tuning block; and
   a second antenna electrically coupled to said output port of said negative impedance converter;
   wherein self-oscillation of a signal of sinusoidal waveform in the negative impedance converter and the first and second antennas results in the first antenna emitting electromagnetic radiation of a first polarization and the second antenna emitting electromagnetic radiation of a second polarization, such that a superposition of the emissions from first and second antennas is emitted at said tuning frequency, by said radiofrequency transmitter; and
   wherein no electrical connection is present between either one of the first and second antennas and any radiofrequency source external to the negative impedance converter.

7. The radiofrequency transmitter of claim 6, wherein said first polarization is orthogonal to said second polarization.

8. The radiofrequency transmitter of claim 7, wherein said tuning block exhibits zero impedance at said tuning frequency and said negative impedance converter is further characterized as being of the S (OCS) type.

9. The radiofrequency transmitter of claim 7, wherein said tuning block exhibits zero admittance at said tuning frequency and said negative impedance converter is further characterized as being of the N (SCS) type.

\* \* \* \* \*